(12) United States Patent
Molawi et al.

(10) Patent No.: US 10,106,642 B2
(45) Date of Patent: Oct. 23, 2018

(54) BIODEGRADABLE COPOLYESTERS

(71) Applicant: BASF SE, Ludwigshafen (DE)

(72) Inventors: Kian Molawi, Ludwigshafen am Rhein (DE); Robert Loos, Ludwigshafen (DE); Andreas Künkel, Neustadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/532,834

(22) PCT Filed: Nov. 30, 2015

(86) PCT No.: PCT/EP2015/078061
§ 371 (c)(1),
(2) Date: Jun. 2, 2017

(87) PCT Pub. No.: WO2016/087372
PCT Pub. Date: Jun. 9, 2016

(65) Prior Publication Data
US 2017/0362373 A1    Dec. 21, 2017

(30) Foreign Application Priority Data

Dec. 5, 2014   (EP) ..................................... 14196578

(51) Int. Cl.
| | |
|---|---|
| *C08G 18/42* | (2006.01) |
| *C08G 18/73* | (2006.01) |
| *C08G 63/91* | (2006.01) |
| *C08G 63/18* | (2006.01) |
| *C08G 63/08* | (2006.01) |
| *C08G 63/80* | (2006.01) |
| *C08G 63/181* | (2006.01) |
| *C08G 63/78* | (2006.01) |

(52) U.S. Cl.
CPC ........... *C08G 18/428* (2013.01); *C08G 18/73* (2013.01); *C08G 63/08* (2013.01); *C08G 63/18* (2013.01); *C08G 63/181* (2013.01); *C08G 63/78* (2013.01); *C08G 63/80* (2013.01); *C08G 63/91* (2013.01); *C08G 63/916* (2013.01)

(58) Field of Classification Search
CPC ........ C08G 63/08; C08G 63/18; C08G 63/78; C08G 63/80; C08G 63/181; C08G 63/91; C08G 63/916
See application file for complete search history.

(56) References Cited

U.S. PATENT DOCUMENTS

| | | | | |
|---|---|---|---|---|
| 5,202,413 A | * | 4/1993 | Spinu .................... | C08G 18/428 525/415 |
| 5,403,897 A | | 4/1995 | Ebato et al. | |
| 5,605,981 A | | 2/1997 | Imamura et al. | |
| 5,854,377 A | * | 12/1998 | Braune .................. | C08G 63/78 528/309.1 |
| 5,889,135 A | * | 3/1999 | Warzelhan .............. | A61L 15/26 528/176 |
| 2011/0187029 A1 | | 8/2011 | Dietrich et al. | |
| 2013/0041130 A1 | | 2/2013 | Xu et al. | |

FOREIGN PATENT DOCUMENTS

| | | |
|---|---|---|
| EP | 0539541 A1 | 5/1993 |
| EP | 0575349 A1 | 12/1993 |
| EP | 0618250 A1 | 10/1994 |
| EP | 652910 A1 | 5/1995 |
| EP | 697427 A2 | 2/1996 |
| WO | WO-92/09654 A2 | 6/1992 |
| WO | WO-9214782 A1 | 9/1992 |
| WO | WO-9219680 A1 | 11/1992 |
| WO | WO-9403543 A1 | 2/1994 |
| WO | WO-2006/097353 A1 | 9/2006 |
| WO | WO-2006/097354 A1 | 9/2006 |
| WO | WO-2010/034710 A1 | 4/2010 |

OTHER PUBLICATIONS

International Preliminary Report on Patentability for PCT/EP2015/08061, dated Jun. 6, 2017.
International Search Report for PCT/EP2015/078061, dated Jan. 25, 2016.
Written Opinion of the International Searching Authority for PCT/EP2015/078061, dated Jan. 25, 2016.

* cited by examiner

*Primary Examiner* — Christopher M Rodd
(74) *Attorney, Agent, or Firm* — Drinker Biddle & Reath LLP

(57) ABSTRACT

The present invention relates to biodegradable copolyesters with molecular weight Mn from 10 000 to 100 000 measured by GPC, obtainable via reaction of i) from 51 to 84% by weight, based on the copolyester, of a branched polyester middle block produced from aliphatic or aliphatic and aromatic dicarboxylic acids and from aliphatic dihydroxy compounds with molecular weight Mn from 5000 to 25 000 measured by $^1$H NMR with from 15.9 to 48.9% by weight, based on the copolyester, of a lactide in the presence of a catalyst, and then the resultant polyester triblock with molecular weight Mn measured by $^1$H NMR from 5800 to 49 500 with ii) from 0.1 to 3% by weight, based on the copolyester, of a diisocyanate.

The present invention further relates to a process for the production of, and to the use of, the abovementioned biodegradable copolyesters.

7 Claims, No Drawings

BIODEGRADABLE COPOLYESTERS

CROSS-REFERENCE TO RELATED APPLICATIONS

This application is a national stage application (under 35 U.S.C. § 371) of PCT/EP2015/078061, filed Nov. 30, 2015, which claims benefit of European Application No. 14196578.0, filed Dec. 5, 2014, both of which are incorporated herein by reference in their entirety.

The present invention relates to biodegradable copolyesters with molecular weight Mn from 10 000 to 100 000 measured by GPC, obtainable via reaction of i) from 51 to 84% by weight, based on the copolyester, of a branched polyester middle block produced from aliphatic or aliphatic and aromatic dicarboxylic acids and from aliphatic dihydroxy compounds with molecular weight Mn from 5000 to 25 000 measured by $^1$H NMR with from 15.9 to 48.9% by weight, based on the copolyester, of a lactide in the presence of a catalyst, and then the resultant polyester triblock with molecular weight Mn measured by $^1$H NMR from 5800 to 49 500 with ii) from 0.1 to 3% by weight, based on the copolyester, of a diisocyanate.

The present invention further relates to a process for the production of, and to the use of, the abovementioned biodegradable copolyesters.

Branched block copolyesters produced as follows are known by way of example from U.S. Pat. No. 5,202,413: more than 50% by weight of a lactide are polymerized onto an aliphatic polyester or an aliphatic polyglycol with low molecular weight (Mn smaller than 4000). A polyfunctional isocyanate is optionally used for chain extension to increase the molecular weight of the resultant block polymer. The block copolymers described in EP 697427 have a similar structure, and have from 50 to 98% by weight content based on lactide units and from 2 to 50% by weight polyester content.

EP 618250 describes linear polyester triblocks with molecular weight (Mn) greater than 30 000 and at the same time very high PLA content. Examples 25 and 26, which are based on a relatively small lactide content, achieve practically no molecular weight increase. There is no description of chain-extension of the resultant polyester triblocks.

The abovementioned branched or linear block copolyesters are described as film materials for the packaging sector. Specifically for packaging films, the combination of maximum tensile strain at break ($\varepsilon_B$) and high tensile stress at break ($\sigma_B$) is a very decisive factor. It is specifically here that the copolyesters mentioned in the prior art with high PLA content do not give satisfactory results.

The present invention therefore relates to biodegradable copolyesters significantly improved in respect of tensile stress at break in thin films.

Accordingly, the biodegradable copolyesters mentioned in the introduction with molecular weight Mn from 10 000 to 100 000 measured by GPC have been found, being obtainable by reacting i) from 51 to 84% by weight, based on the copolyester, of a branched polyester middle block produced from aliphatic or aliphatic and aromatic dicarboxylic acids and from aliphatic dihydroxy compounds with molecular weight Mn from 5000 to 25 000 measured by $^1$H NMR with from 15.9 to 48.9% by weight, based on the copolyester, of a lactide in the presence of a catalyst, and then the resultant polyester triblock with molecular weight Mn measured by $^1$H NMR from 5800 to 49 500 with iii) from 0.1 to 3% by weight, based on the copolyester, of a diisocyanate.

The invention is described in more detail below.

The soft polyester middle block i is first synthesized, being produced from aliphatic and aromatic dicarboxylic acids and from aliphatic dihydroxy compound, these materials being known as aliphatic-aromatic polyesters, or being produced from aliphatic polyesters made of aliphatic dicarboxylic acids and of aliphatic diols. A feature common to these polyester middle blocks is that they are biodegradable in accordance with DIN EN 13432. Mixtures of a plurality of these polyester middle blocks i are of course also suitable.

Preference is given to polyester middle blocks i with molecular weight Mn from 5000 to 25 000 measured by $^1$H NMR and said middle block i is composed of A) an acid component
    a1) from 45 to 100 mol %, based on the acid component A, of at least one aliphatic dicarboxylic acid selected from the group consisting of succinic acid, adipic acid, azelaic acid, sebacic acid, and brassylic acid, and ester-forming derivatives thereof, and mixtures thereof
    a2) from 0 to 55 mol %, based on the acid component A, of a terephthalic acid or a furan-2,5-dicarboxylic acid, or ester-forming derivatives thereof; and B) an alcohol component:
    b1) from 98 to 99.99 mol %, based on the alcohol component B, of at least one $C_2$- to $C_{12}$-alkanediol, or a mixture thereof; and
    b2) from 0.01 to 2 mol %, based on the alcohol component B, of a polyol selected from the group consisting of trimethylolpropane, trimethylolethane, pentaerythritol, polyethertrol, and glycerol.

Among the suitable aliphatic-aromatic polyesters are non-chain-extended polyesters as described by way of example in WO 92/09654. More recent developments of interest are based on renewable raw materials are described by way of example in WO-A 2006/097353, WO-A 2006/097354, or WO-A 2010/034710.

Among the particularly preferred aliphatic-aromatic polyester middle blocks i are polyesters comprising as essential components:

A) an acid component made of:
    a1) from 50 to 80 mol %, preferably from 50 to 60 mol %, in each case based on the acid component A, of at least one aliphatic dicarboxylic acid selected from the group consisting of: succinic acid, adipic acid, azelaic acid, sebacic acid, and brassylic acid, and ester-forming derivatives thereof, and mixtures thereof;
    a2) from 20 to 50 mol %, preferably from 40 to 50 mol %, based in each case on the acid component A, of at least one terephthalic acid or ester-forming derivative thereof; and B) an alcohol component made of:
    b1) from 98 to 99.99 mol %, preferably from 99.0 to 99.9 mol %, based on the alcohol component B, of 1,3-propanediol or 1,4-butanediol, or a mixture thereof; and
    b2) from 0.01 to 2 mol %, preferably from 0.1 to 1 mol %, based on the alcohol component B, of a polyol selected from the group consisting of trimethylolpropane, pentaerythritol, and glycerol.

Aliphatic acids and the corresponding derivatives a1 that can be used are generally those having from 2 to 18 carbon atoms, preferably from 4 to 10 carbon atoms. They can be either linear or branched. However, it is also possible in principle to use dicarboxylic acids having a larger number of carbon atoms, for example having up to 30 carbon atoms.

The following may be mentioned by way of example: oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxalacetic acid, glutamic acid, aspargic acid, itaconic acid, and maleic acid.

It is possible here to use the dicarboxylic acids or ester-forming derivatives thereof, individually or in the form of a mixture of two or more of these.

It is preferable to use succinic acid, adipic acid, azelaic acid, sebacic acid, brassylic acid, or respective ester-forming derivatives thereof, or a mixture of these. It is particularly preferable to use succinic acid, adipic acid, or sebacic acid, or respective ester-forming derivatives thereof, or a mixture of these. Succinic acid, azelaic acid, sebacic acid, and brassylic acid moreover have the advantage that they are obtainable from renewable raw materials.

Particular preference is given to the following aliphatic-aromatic polyester middle blocks: polybutylene adipate terephthalate (PBAT), polybutylene sebacate terephthalate (PBSeT), and polybutylene succinate terephthalate (PBST).

Terephthalic acid or furan-2,5-dicarboxylic acid is generally used as aromatic dicarboxylic acid; ester-forming derivatives of these—for example dimethyl terephthalate or dimethyl furan-2,5-dicarboxylate—can also be used.

The diols B are generally selected from branched or linear alkanediols having from 2 to 12 carbon atoms, preferably form 4 to 6 carbon atoms, or from cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol, and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol, and 2,2,4,4-tetramethyl-1,3-cyclobutanediol. Particular preference is given to 1,4-butanediol and 1,3-propandiol. 1,4-Butanediol and 1,3-propanediol moreover have the advantage that they are obtainable from renewable raw materials. It is also possible to use mixtures of various alkanediols.

From 0 to 2 mol %, preferably from 0.01 to 2 mol %, and with particular preference from 0.1 to 1 mol %, based on the diol component B, of a branching agent b2 composed of an at least trihydric alcohol is generally used. Preference is given to polyols such as trimethylolpropane, pentaerythritol, and in particular glycerol.

The number-average molar mass (Mn) of the polyester middle blocks i is generally in the range from 5000 to 25 000 g/mol, in particular in the range from 10 000 to 25 000 g/mol, preferably in the range from 12 000 to 20 000 g/mol, the weight-average molar mass (Mw) of said blocks i is generally from 10 000 to 75 000 g/mol, preferably from 20 000 to 50 000 g/mol, their Mw/Mn ratio generally being from 1 to 6, preferably from 2 to 4. Intrinsic viscosity is from 50 to 180 g/mL, preferably from 80 to 120 g/mL (measured in o-dichlorobenzene/phenol (ratio by weight 50/50)).

Aliphatic polyester middle blocks i are made of aliphatic diols and of aliphatic dicarboxylic acids. In particular, these are polybutylene succinate (PBS), polybutylene adipate (PBA), polybutylene succinate adipate (PBSA), polybutylene succinate sebacate (PBSSe), or polybutylene sebacate (PBSe).

Again, the aliphatic polyester middle blocks i preferably comprise from 0.01 to 2 mol %, and with particular preference from 0.1 to 1 mol %, based on the alcohol component B, of a branching agent b2, in particular of a polyol selected from the group consisting of: trimethylolpropane, trimethylolethane, pentaerythritol, polyethertriol, and in particular glycerol.

The number-average molar mass (Mn) of the aliphatic polyester middle blocks i is generally in the range from 5000 to 25 000 g/mol, in particular in the range from 10 000 to 25 000 g/mol, preferably in the range from 12 000 to 20 000 g/mol, the weight-average molar mass (Mw) of said blocks i is generally from 10 000 to 75 000 g/mol, preferably from 20 000 to 50 000 g/mol, their Mw/Mn ratio generally being from 1 to 6, preferably from 2 to 4. Intrinsic viscosity is from 50 to 180 g/mL, preferably from 80 to 120 g/mL (measured in o-dichlorobenzene/phenol in a ratio by weight of 50/50).

The polyester middle block i can be isolated as intermediate for analytical purposes. Its molecular weight Mn is generally from 5000 to 25 000, preferably from 10 000 to 25 000, and with particular preference from 12 000 to 20 000, determined by the $^1$H NMR method. The method for determination of molecular weight (Mn) by $^1$H NMR is described in detail in the performance testing section.

For the further reaction with lactide it is advantageous for the polyester middle block i to have high content of hydroxy end groups. With particular preference, the content of hydroxy end groups (determination of hydroxy number and acid number; end group content=hydroxy number:(hydroxy number+acid number)) is more than 85%, preferably more than 90%, and with particular preference more than 95%.

The catalyst, for example dissolved in a solvent, is then preferably added to the polyester middle block i. It is preferable to use tin dioctanate as catalyst.

Lactide is then added to the abovementioned mixture. The concentration generally used in the lactide is from 15.9 to 48.9% by weight, preferably from 20 to 40% by weight, based on the total weight of the copolyester iii. This corresponds to a ratio of proportions by weight of lactide to middle block i of from 0.19 to 0.96, preferably from 0.25 to 0.67. The quantity of L-lactide used is generally more than 80%, preferably more than 90%, based on the entire quantity of lactide.

The molecular weight Mn of the triblock polymer ii is generally from 5800 to 49 500, preferably from 12 000 to 49 500, and with particular preference from 18 000 to 40 000 measured by $^1$H NMR.

The biodegradable copolyesters of the invention can preferably be produced as follows in a continuous process:

i-1) a mixture of the aliphatic dihydroxy compounds and the aliphatic and aromatic dicarboxylic acids are mixed to give a paste, optionally without addition of a catalyst, or alternatively the dihydroxy compound and the liquid esters of the dicarboxylic acids, and optionally other comonomers are fed into the system, optionally without addition of a catalyst, and in a first stage this mixture is continuously esterified or, respectively, transesterified together with optionally the entire quantity or a partial quantity of the catalyst;

i-2) in a second stage, the transesterification or esterification product obtained according to i-1) is continuously precondensed until intrinsic viscosity in accordance with DIN 53728 reaches from 20 to 70 cm$^3$/g;

i-3) in a third stage, the product obtainable from 1-2) is continuously polycondensed until intrinsic viscosity in accordance with DIN 53728 reaches from 30 to 180 cm$^3$/g, where the ratio of hydroxy number to (hydroxy number+acid number) in the middle blocks is more than 85%, preferably more than 90%, and particularly preferably more than 95%, and ii) from 51 to 84% by weight, based on the copolyester, of the polyester middle block obtainable from i-3) is then continuously reacted with from 15.9 to 48.9% by weight, based on the copolyester, of a lactide in the presence of tin dioctanate, and iii) in a fifth stage, the polyester triblock obtainable from ii) is continuously reacted in a polyaddition reaction with from 0.1 to 3% by weight, based on the copolyester, of a diisocyanate until intrinsic viscosity in accordance with DIN 53728 reaches from 100 to 320 $cm^3/g$.

Other components that can preferably be used are by way of example from 10 to 35% by weight, based on the total weight of the copolyester iii, of an inorganic or organic filler. The expression inorganic fillers means by way of example calcium carbonate, talc, graphite, gypsum, conductive carbon black, iron oxide, calcium chloride, kaolin, silicon dioxide (quartz), sodium carbonate, titanium dioxide, silicate, wollastonite, mica, montmorillonite, and mineral fibers. The minerals can also be used in the form of nanofillers.

Nanofillers are in particular fine-particle phyllosilicates, preferably clay minerals, particularly preferably clay minerals which comprise montmorillonite and the surface of which have been modified by one or more quaternary ammonium salts and/or phosphonium salts, and/or sulfonium salts. Preferred clay minerals are naturally occurring montmorillonites and bentonites. Particularly preferred inorganic fillers are calcium carbonate and talc. A material that has proven suitable is inter alia the calcium carbonate from Omya. The average particle size of the calcium carbonate is generally from 0.5 to 10 micrometers, preferably from 1 to 5 micrometers, particularly preferably from 1 to 2.5 micrometers. A material that has proven suitable is inter alia the talc from Mondo Minerals. The average particle size of the talc is generally from 0.5 to 10 micrometers, preferably from 1 to 8 micrometers, particularly preferably from 1 to 3 micrometers.

Organic fillers such as starch or amylose can moreover be added to the copolyesters iii. Starch and amylose can be native, i.e. not thermoplastified, or thermoplastified with plasticizers such as glycerol or sorbitol (EP A 539 541, EP-A 575 349, EP 652 910).

The copolyesters iii of the invention can moreover comprise other additives known to the person skilled in the art. Examples are the additives conventionally used in plastics technology, for example stabilizers; nucleating agents; lubricants and release agents such as stearates (in particular calcium stearate); plasticizers, for example citric esters (in particular tributyl acetylcitrate), glycerol esters such as triacetylglycerol, or ethylene glycol derivates, surfactants such as polysorbates, palmitates, or laurates; waxes, for example erucamide, stearamide, or behenamide, beeswax, or beeswax esters; antistatic agent, UV absorbers; UV stabilizers; antifogging agents, or dyes. The concentrations used of the additives are from 0 to 5% by weight, in particular from 0.1 to 2% by weight, based on the polyesters of the invention. The polyesters of the invention can comprise from 0.1 to 10% by weight of plasticizers.

For the purposes of the present invention, a substance or a substance mixture complies with the "biodegradable" feature if said substance or the substance mixture exhibits a percentage degree of biodegradation of at least 90% in accordance with DIN EN 13432.

The biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. The biodegradability can by way of example be quantified by mixing polyester with compost and storing it for a particular period. By way of example, in accordance with DIN EN 13432 (with reference to ISO 14855), $CO_2$-free air is passed through ripened compost during the composting process, and the compost is subjected to a defined temperature profile. The biodegradability here is defined as a percentage degree of biodegradation, by taking the ratio of the net amount of $CO_2$ released from the specimen (after a subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit clear signs of degradation after just a few days of composting, examples being fungal growth, cracking, and perforation.

Other methods of determining biodegradability are described by way of example in ASTM D5338 and ASTM D6400-4. The disintegration tests mentioned in the application are based on the standard ISO 16929 (2013).

The biodegradable copolyesters iii mentioned in the introduction are suitable for the production of nets and textile, blown films, chill-roll films with and without orientation in a further step, with and without metallization or SiOx coating.

The copolyesters iii defined in the introduction are in particular suitable for blown films and stretch films. Possible applications here are basal-fold bags, lateral-seam bags, carrier bags with hole grip, shrink labels, or vest-style carrier bags, inliners, heavy-duty bags, freezer bags, composting bags, agricultural films (mulch films), film bags for food packaging, peelable closure film—transparent or opaque—weldable closure film—transparent or opaque—sausage casing, salad film, freshness-retention film (stretch film) for fruit and vegetables, meat, and fish, stretch film for pallet-wrapping, net film, packaging films for snacks, chocolate bars and muesli bars, peelable lid films for dairy packaging (yoghurts, cream, etc.), fruit and vegetables, and semirigid packaging for smoked sausage and for cheese.

The ultimate tensile strength of the copolyesters iii after extrusion to give single- or multilayer blown, cast, or pressed films is high (in accordance with EN ISO 6383-2: 2004). Tear-propagation resistance is a very important product property especially in the sector of thin (blown) films for, by way of example, biowaste bags or thin-walled carrier bags (e.g. vest-style carrier bags, fruit bags). It is also particularly important in the case of mulch films in the agricultural sector.

Performance Tests:

Intrinsic viscosities were determined in accordance with DIN 53728 part 3, Jan. 3, 1985, Capillary viscometry. An M-II micro-Ubbelohde viscometer was used. The following mixture was used as solvent: phenol/o-dichlorobenzene in a ratio by weight of 50/50.

The tensile properties of the polymers were determined in accordance with ISO 527-2 on test specimens in accordance with ISO 527-S/5A. The test specimens were punched out from a pressed film of thickness about 130 μm.

Determination of acid number about 1.0 g of specimen were weighed accurately (m) and dissolved in 10 ml of toluene and 10 ml of pyridine. After addition of 5 ml of deionized water and 50 ml of tetrahydrofuran, a standard ethanolic solution of potassium hydroxide was used for inflection-point-based potentiographic titration (VP) [potentiograph equipped with a Dosimat with exchangeable burette (e.g. 10 ml) and with a combined glass-Ag/AgCl electrode, e.g. Titroprocessor type 726 with Dosimat 685 (Metrohm)]. The blind value was titrated under the same conditions, but without test specimen (VB).

Calculated: acid number in mg $KOH/g=[(VP-VB) \cdot cKOH \cdot tKOH \cdot 56.10 \text{ g} \cdot mol^{-1}]:m$ Determination of hydroxy number about 1.0 g of specimen were accurately weighed (m) and dissolved in 10 ml of toluene. 9.8 ml of acetylating reagent [acetylating reagent: 810 ml of pyridine+100 ml of acetic anhydride+9 ml of acetic acid] were added, and the mixture was stirred at 95° C. for 1 h. After addition of 5 ml of deionized water, the specimen was cooled to room temperature, with stirring, and 50 ml of tetrahydrofuran were admixed, and the mixture was used for inflection-point-based potentiographic titration with standard 0.5 molar ethanolic potassium hydroxide solution (VP) [potentiograph equipped with a Dosimat with exchangeable burette (e.g. 10 ml) and with a combined glass-Ag/AgCl electrode, e.g. Titroprocessor type 726 with Dosimat 685 (Metrohm)]. The blank value was titrated under the same conditions, but without test specimen (VW).

Calculated: hydroxy number in mg $KOH/g=[(VW-VP) \cdot cKOH \cdot tKOH \cdot 56.10 \text{ g} \cdot mol^{-1}]:m$ The molecular weight Mn of the polyester middle blocks i was determined by means of $^1H$ NMR spectroscopy (solvent: 1,1,2,2-tetrachloroethane-D2). For this, the ratio between the sum of the integrals from 4.0 to 4.5 (CH2-OOCR) to the sum of the integrals from 3.58 to 3.78 (terminal polyester-CH2 groups) was calculated.

Calculation: Mn in g/mol=integral4.0-4.5:integral3.58-3.78·(average mass of a repeating unit of the polyester)·(hydroxy number):(hydroxy number+acid number)

The molecular weight Mn of the triblocks ii was likewise determined by means of $^1H$ NMR spectroscopy (solvent: 1,1,2,2-tetrachloroethane-D2). For this, the ratio between the sum of the integrals from 4.0 to 4.5 (CH2-OOCR) to the PLA integral from 5.1 to 5.3 was calculated—taking into account the Mn previously determined for the middle block x.

The molecular weights Mn of the multiblocks ill and the polydispersity index (PDI) of the polyesters were determined by means of gel permeation chromatography (GPC) in accordance with DIN 55672-1; eluent hexafluoroisopropanol (HFIP)+0.05% by weight of potassium trifluoroacetate; the calibration process used narrowly distributed polymethyl methacrylate standards.

Composting for qualitative assessment of disintegration of pressed films (thickness about 280 μm): the test used is based on the standard ISO 16929 (2013, quantitative determination of disintegration by way of mass balance), but disintegration was estimated only by a qualitative visual method.

Precursors—production of the middle block i (MB)
MB1: Polybutylene terephthalate-co-adipate (PBAT)
(Molar ratio of terephthalic acid to adipic acid=47:53)

456.31 g of dimethyl terephthalate, 585.78 g of 1,4-butanediol, 1.05 g of glycerol, and 0.6 g of tetrabutyl orthotitanate (TBOT) were used as initial charge in a 2 L four-necked flask, and the apparatus was flushed with nitrogen. Methanol was removed by distillation until internal temperature was 190° C. 387.27 g of adipic acid were then added, and water was removed by distillation until the internal temperature was 220° C. The mixture was cooled to about 180° C., 0.6 g of tetrabutyl orthotitanate (TBOT) was added, and vacuum was applied (2 mbar). Finally, the mixture was heated until the internal temperature was 240° C., and once the desired viscosity had been reached was cooled to room temperature.

IV=94 mL/g; Mn=15 300 g/mol; PDI=2.5, terminal group ratio of hydroxy number to (hydroxy number+acid number)=91%

MB2: Polybutylene terephthalate-co-adipate (PBAT)
(Molar ratio of terephthalic acid:adipic acid=47:53)
Analogous to MB1, doubled batch size in a 5 L reactor.
IV=101 mL/g; Mn=16 000 g/mol; PDI=2.8, terminal group ratio of hydroxy number to (hydroxy number+acid number)=96%

EXAMPLES

Comparative Example 1

A mixture of 68% by weight of Ecoflex® F1300 (polybutylene terephthalate-co-adipate from BASF SE) and 32% of Ingeo® 4043 D (polylactic acid from NatureWorks) were compounded in a Coperion MC 40 extruder. The discharge temperatures were set to 250° C. The extrudate was then pelletized under water.

Comparative Example 2—(PLA)-(Polybutylene Terephthalate-Co-Adipate)-(PLA)

140.0 g of polybutylene terephthalate-co-adipate (MB1; terephthalic acid:adipic acid=47:53) were used as initial charge in a 500 mL four-necked flask, and the apparatus was flushed with nitrogen. The mixture was heated until the internal temperature was 185° C., and 35.0 g of L-lactide and 0.51 mL of tin(II) bis(2-ethylhexanoate) (10% solution in toluene) were added. After 50 min and after 60 min 0.9 mL of hexamethylene diisocyanate was in each case added, and after a further 5 min the mixture was cooled to room temperature.

IV=153 ml/g; Mn=25 900 g/mol; PDI=4.8

Inventive Example 3—(PLA)-(Polybutylene Terephthalate-Co-Adipate)-(PLA)

150.0 g of polybutylene terephthalate-co-adipate (MB1; terephthalic acid:adipic acid=47:53) were used as initial charge in a 500 mL four-necked flask, and the apparatus was flushed with nitrogen. The mixture was heated until the internal temperature was 185° C., and 75.0 g of L-lactide and 1.09 mL of tin(III) bis(2-ethylhexanoate) (10% solution in toluene) were added. After 60 min and after 75 min 0.96 mL of hexamethylene diisocyanate was in each case added, and after a further 5 min the mixture was cooled to room temperature.

IV=185 mL/g; Mn=34 900 g/mol; PDI=4.3

Inventive Example 4—(PLA)-(Polybutylene Terephthalate-Co-Adipate)-PLA)

82.5 g of polybutylene terephthalate-co-adipate (MB1; terephthalic acid:adipic acid=47:53) were used as initial charge in a 500 mL four-necked flask, and the apparatus was flushed with nitrogen. The mixture was heated until the internal temperature was 185° C., and 55.0 g of L-lactide and 0.78 mL of tin(II) bis(2-ethylhexanoate) (10% solution in toluene) were added. After 55 min, 0.53 mL of hexamethylene diisocyanate was added, and after a further 5 min the mixture was cooled to room temperature.
IV=160 mug; Mn=33 300 g/mol; PDI=3.5

Inventive Example 5—(PLA)-(Polybutylene Terephthalate-Co-Adipate)-(PLA)

65.0 g of polybutylene terephthalate-co-adipate (MB1; terephthalic acid:adipic acid=47:53) were used as initial charge in a 500 mL four-necked flask, and the apparatus was flushed with nitrogen. The mixture was heated until the internal temperature was 185° C., and 65.0 g of L-lactide and 0.92 mL of tin(II) bis(2-ethylhexanoate) (10% solution in toluene) were added. After 55 min, 0.41 mL of hexamethylene diisocyanate was added, and after a further 5 min the mixture was cooled to room temperature.
IV=122 mL/g; Mn=26 800 g/mol; PDI=2.9

Inventive Example 6—(PLA)-(Polybutylene Terephthalate-Co-Adipate)-(PLA)

300.0 g of polybutylene terephthalate-co-adipate (MB2; terephthalic acid:adipic acid=47:53) were used as initial charge in a 1 mL four-necked flask, and the apparatus was flushed with nitrogen. The mixture was heated until the Internal temperature was 185° C., and 150.0 g of L-lactide and 2.18 mL of tin(II) bis(2-ethylhexanoate) (10% solution in toluene) were added. After 55 min and after 68 min 1.71 mL of hexamethylene diisocyanate were in each case added, and after a further 7 min the mixture was cooled to room temperature.
IV=126 mL/g; Mn=44 100 g/mol; PDI=7.2

TABLE 1

Mechanical data (tensile test in accordance with ISO 527 on pressed films of the thickness stated in the table)

| Example | Proportion of PBAT % | Proportion of PLA % | Thickness μm | Modulus of elasticity MPa | $\varepsilon_y$ % | $\sigma_y$ MPa | $\varepsilon_M$ % | $\sigma_M$ MPa | $\varepsilon_B$ % | $\sigma_B$ MPa | $a_B$ J/cm³ |
|---|---|---|---|---|---|---|---|---|---|---|---|
| CE1 compound | 68 | 32 | 136 | 221 | — | — | 378 | 28 | 386 | 26 | 45 |
| CE2 | 85 | 15 | 119 | 70 | 32 | 8 | 589 | 33 | 592 | 32 | 49 |
| IE3 | 71 | 29 | 134 | 95 | 32 | 10 | 489 | 42 | 489 | 41 | 50.5 |
| IE4 | 64 | 36 | 81 | 263 | 18 | 18 | 503 | 39 | 505 | 39 | 66 |
| IE5 | 53 | 47 | 106 | 612 | 7 | 27 | 388 | 42 | 390 | 41 | 61 |

$\varepsilon_y$ tensile strain at yield stress (tensile strain at yield)
$\sigma_y$ yield stress
$\varepsilon_M$ tensile strain on determination of tensile strength
$\sigma_M$ tensile strength
$\varepsilon_B$ tensile strain at break
$\sigma_B$ tensile stress at break
$a_B$ fracture energy The inventive copolyesters IE3 to IE5 exhibited optimized tensile strain at break/tensile stress at break performance in comparison with a mixture of the two individual components (CE1) and in comparison with films made of copolyesters with an excessively low proportion of PLA (15%, CE2). CE2 moreover exhibited a very low modulus of elasticity, and poor tensile stress at break performance. Copolyesters with a proportion of PLA greater than 49% exhibited high viscosity even before addition of the diisocyanate, and problems therefore occurred with the mixing procedure. Films produced from copolyesters of that type moreover lacked acceptable tensile strain performance.

TABLE 2

Disintegration test result

| Example | Proportion of PBAT % | Proportion of PLA % | Thickness μm | Degradation after 12 weeks by analogy with standard 16929 |
|---|---|---|---|---|
| CE1 compound | 68 | 32 | 280 | incomplete |
| IE6 | 68 | 32 | 280 | complete |

The invention claimed is:

1. A process for the continuous production of biodegradable copolyesters, which comprises
   i-1) mixing a mixture of an aliphatic dihydroxy compounds and an aliphatic and an aromatic dicarboxylic acids to give a paste, optionally without addition of a catalyst, or alternatively a dihydroxy compound and the liquid esters of dicarboxylic acids, and optionally other comonomers are fed into the system, optionally without addition of a catalyst, and in a first stage this mixture is continuously esterified or, respectively, transesterified together with optionally the entire quantity or a partial quantity of the catalyst;
   i-2) in a second stage, the transesterification or esterification product obtained according to i-1) is continuously precondensed until intrinsic viscosity in accordance with DIN 53728 reaches from 20 to 70 cm³/g;
   i-3) in a third stage, the product obtained from i-2) is continuously polycondensed until intrinsic viscosity in accordance with DIN 53728 reaches from 50 to 180 cm³/g to produce middle block i, wherein the ratio of hydroxy number to (hydroxy number+acid number) in said middle block i is more than 85% and the molecular weight Mn of said middle block i is from 5000 to 25 000 measured by ¹H NMR,
   ii) from 51 to 84% by weight, based on the copolyester, of the polyester middle block i obtained from i-3) is then continuously reacted with from 15.9 to 48.9% by weight, based on the copolyester, of a lactide in the presence of tin dioctanate, and
   iii) in a fifth stage, the polyester triblock obtained from ii) with molecular weight Mn from 5800 to 49 500 measured by ¹H NMR is continuously reacted in a polyaddition reaction with from 0.1 to 3% by weight, based on the copolyester, of a diisocyanate until intrinsic viscosity in accordance with DIN 53728 reaches from 100 to 320 cm³/g.

2. The process according to claim 1, wherein the molecular weight Mn of the polyester middle block i is from 5000 to 25 000 measured by ¹H NMR and said middle block i is composed of:
A) an acid component:
  a1) from 45 to 100 mol %, based on the acid component A, of at least one aliphatic dicarboxylic acid selected from the group consisting of succinic acid, adipic acid, azelaic acid, sebacic acid, and brassylic acid, and ester-forming derivatives thereof, and mixtures thereof
  a2) from 0 to 55 mol %, based on the acid component A, of a terephthalic acid or a furan-2,5-dicarboxylic acid, or ester-forming derivatives thereof; and
B) an alcohol component:
  b1) from 98 to 99.99 mol %, based on the alcohol component B, of a $C_2$- to $C_{12}$-alkanediol, or a mixture thereof; and
  b2) from 0.01 to 2 mol %, based on the alcohol component B, of a polyol selected from the group consisting of trimethylolpropane, trimethylolethane, pentaerythritol, polyethertriol, and glycerol.

3. The process according to claim 2, wherein the molecular weight Mn of the polyester middle block i is from 10 000 to 25 000 measured by ¹H NMR and said middle block i is composed of:

A) an acid component:
  a1) from 50 to 80 mol %, based on the acid component A, of at least one aliphatic dicarboxylic acid selected from the group consisting of succinic acid, adipic acid, and sebacic acid, and ester-forming derivatives thereof, and mixtures thereof
  a2) from 20 to 50 mol %, based on the acid component A, of a terephthalic acid or ester-forming derivative thereof; and
B) an alcohol component:
  b1) from 98 to 99.99 mol %, based on the alcohol component B, of 1,4-butanediol or 1,3-propanediol, or a mixture thereof; and
  b2) from 0.01 to 2 mol %, based on the alcohol component B, of a polyol selected from the group consisting of trimethylolpropane, pentaerythritol, and glycerol.

4. The process according to claim 1, wherein more than 90% of the quantity of the lactide in step ii) used is composed of L-lactide.

5. The process according to claim 3, wherein more than 90% of the quantity of the lactide in step ii) used is composed of L-lactide.

6. The process according to claim 1, wherein hexamethylene diisocyanate is used as diisocyanate in step iii).

7. The process according to claim 5, wherein hexamethylene diisocyanate is used as diisocyanate in step iii).

\* \* \* \* \*